May 26, 1931.     O. M. SUMMERS     1,806,653
POWER TRANSMITTING DEVICE
Filed Feb. 27, 1928
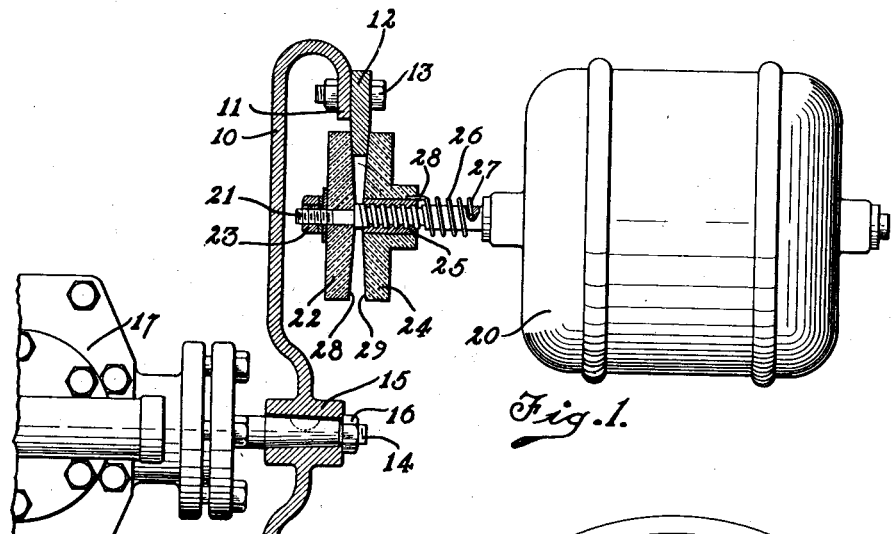
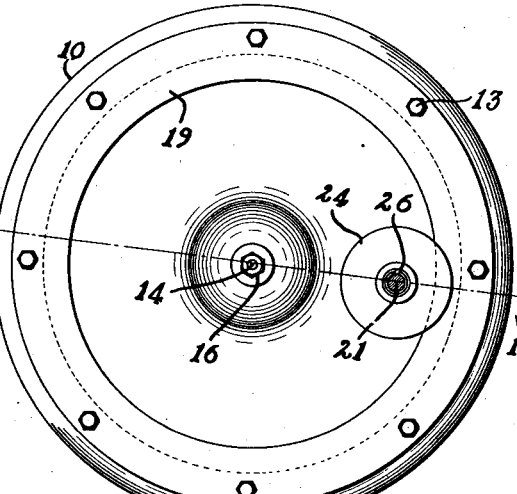
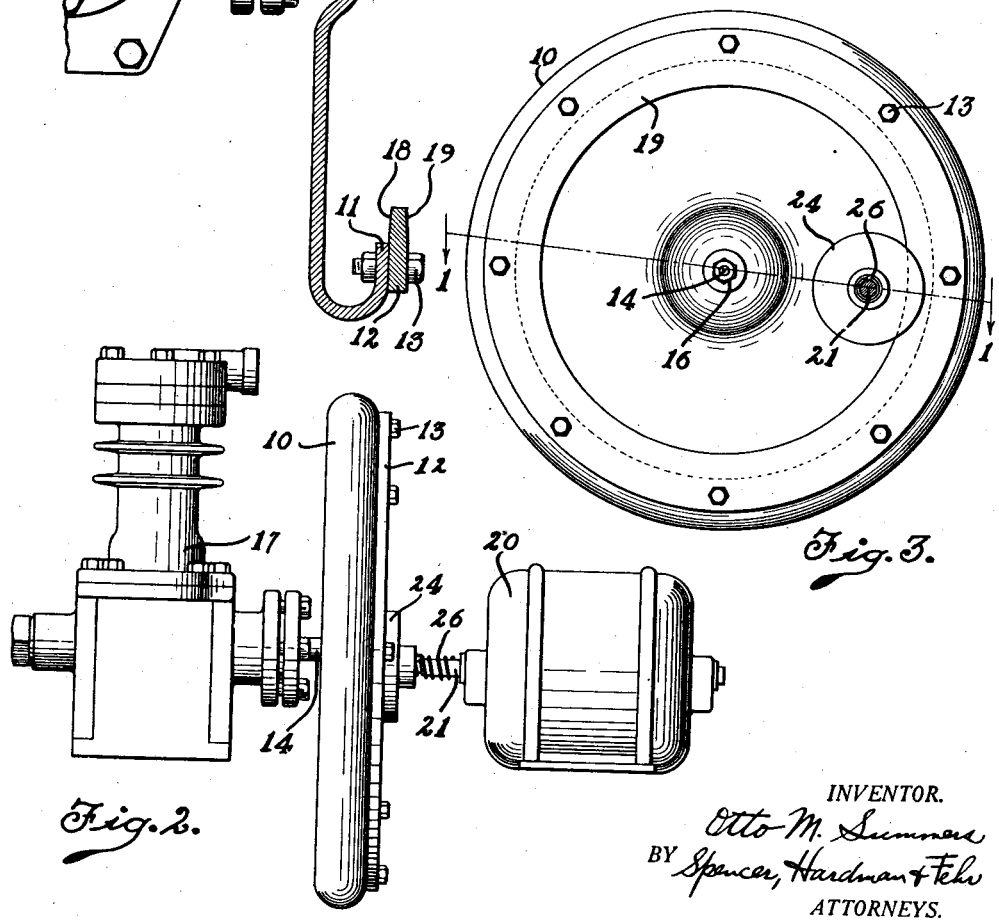
INVENTOR.
Otto M. Summers
BY Spencer, Hardman & Fehr
ATTORNEYS.

Patented May 26, 1931

1,806,653

UNITED STATES PATENT OFFICE

OTTO M. SUMMERS, OF DAYTON, OHIO, ASSIGNOR TO FRIGIDAIRE CORPORATION, OF DAYTON, OHIO, A CORPORATION OF DELAWARE

POWER TRANSMITTING DEVICE

Application filed February 27, 1928. Serial No. 257,301.

This invention relates to improvements in frictional power transmitters and has for one of its objects to provide a simple mechanism for communicating motion and transmitting power.

It is an object of the invention to provide improved means for transmitting power without the use of belts, chains, gears and the like.

A further object is to improve power transmitting systems of the frictional surface type and particularly that type in which the axes of the driving and driven members are disposed in the same longitudinal direction. My invention contemplates increasing the effective frictional surface contact between the driving and driven elements. One manner of carrying this out is to arrange the driving member and driven member in such manner that the arcs through which these members rotate approach the condition of parallel arcs.

It is a still further object to provide a frictional driving system comprising a driven element and a driving element, both of said elements having surfaces adapted to engage each other and having means for urging such surfaces into engagement for power transmitting relation when the system is operated.

The improved friction drive of the invention comprises a driving element and a driven element of which the driving element comprises a device resembling a pulley mounted on the shaft of a motor or the like.

This pulley works in frictional engagement with the driven member which includes a circular ring carried by a circular or wheel shaped member attached to a shaft. Either or both of the members may be provided with driving faces made of suitable material. Either of the members may be the driving member but preferably the pulley is the driving member when the amount of power transmitted is considerable.

Further objects and advantages of the present invention will be apparent from the following description, reference being had to the accompanying drawings, wherein a preferred form of the present invention is clearly shown.

In the drawings:

Fig. 1 shows a top view partly in section of the improved transmission device of the invention, the cut being taken on the line 1—1 of Fig. 3.

Fig. 2 is a side view of the same.

Fig. 3 illustrates the operative elements of the device viewed from the front.

Referring in detail to the drawings wherein a preferred embodiment of the invention is shown applied to the driving of the compressor of a refrigerating apparatus, the driven member comprises a disc or wheel-shaped member 10 preferably made of sheet metal of suitable thickness which is adapted to be mounted as by a hub-flange 15 on the shaft 14 of the compressor 17. It may be secured to the shaft by a key 15 and a nut 16 cooperating with the threaded extremity of the shaft.

This wheel-shaped member 10 carries a turned-over flange 11 upon which is secured in any suitable manner, as by bolts 13 or rivets an annular member or friction ring 12 having beveled surfaces 18 and 19. This member may be made of any suitable material, an "adhesive alloy" capable of presenting a rough surface being preferable. An example of such material may be cast iron or metal containing admixed abrasives or the like. Cooperating with the driven member 10 is a driving member comprising a pulley or driving wheel having one of its sides fixed to a shaft and the other of its sides axially displaceable with respect to the fixed portion and arranged to be urged constantly towards the fixed portion.

As shown in detail in Fig. 1 the driving pulley is disposed on the shaft 21 of a motor 20 and comprises a portion 22 held against rotation with respect to the shaft 21 as by engaging with flattened surface thereon aided by a bolt 23. The other portion of the driving system comprises a similar member 24 which however is axially displaceable on shaft 21 with respect to the member 22 and for this purpose is carried on a sleeve 25 having internal threads engaging with external threads on shaft 21. The pitch of these threads is quite steep and the thread is so selected that when the pulley or driving system is rotated in the direction in which it is adapted to operate the compressor, the member 24 tends to approach the member 22. This tendency of the member 24 to approach member 22 is augmented by a spring 26 which is attached to the shaft as at 27 and to the member 24 as at 28 and which is so wound that it tends to rotate the member 24 upon the threaded portion of shaft 21 in the same direction. The faces or cheeks 28 and 29 of the members 22 and 24 respectively may be suitably beveled as shown in Fig. 1 so that the two conical sides when moved together form a groove whose sides 28 and 29 bear against the sides 18 and 19 respectively of the ring 12. In the preferred embodiment of the invention the members 22 and 24 are made of a substance which is substantially softer than the ring 12. Suitable materials are fibre, and the well-known friction-drive compositions containing phenol formaldehyde resins in combination with fibre, canvas, filling agents and the like. It is of course obvious that any selection of materials may be used for the frictionally engaging surfaces of the ring 12 and the members 22 and 24 and that if conditions require, the ring 12 may also be made of a relatively soft material.

The driving member is so positioned with respect to the driven member that the friction ring 12 carried by the latter is wedged or clamped between the members 22 and 24 of the driving member.

The angle of the groove formed by the cheeks or faces of the members 22 and 24 of the driving wheel is preferably relatively acute as shown in Fig. 1, while the angle formed by the beveled surfaces of the ring 12 is approximately the same. The inner or opposed faces of the discs of the pulley or driving member are beveled in diverging lines from their center outward and the bevel of the friction ring 12 agrees substantially in direction with the surfaces of the pulley. However, without departing from the spirit of the invention, the angle formed by the frictional surfaces of the driven wheel may vary from the angle formed by the frictional surfaces of the driving wheel. It is of course obvious that the peripheral edge of ring 12 must not contact with the bottom of the groove in the driving member.

When the device is in operation the friction members on the driving pulley will coact with the friction surfaces on the driven member to rotate the latter, the adhesion between the driven and driving members serving to carry the driven ring around with the driving wheel. The pressure with which the ring 12 is clamped between the surfaces of the driving member may be varied by suitable proportioning of the spring and the pitch of the threads on the shaft and sleeve.

The improved friction drive of the invention has many advantages over other forms of drive. By its use the slippage or lost motion ordinarily occurring when a driving member and a driven member are connected by a belt when said belt stretches is reduced to a minimum. Furthermore the area of contact of the driving and driven surfaces is greater than would be the case of an external type of drive. It is obvious that if two wheels or surfaces are meshed together to form an external drive, the arcs through which the driven and driving members engage are opposed to one another, and the amount of the surfaces in contact is quite small and is substantially of the order of tangential contact. It is however, apparent that greater area of effective meshing contact is had by the use of an internal friction system, since in such a case the arcs do not oppose one another but rather approach the condition of parallel arcs. It is quite apparent that while the portions of the arcs of their engaging surfaces appear to be limited in extent, they are nevertheless considerably greater than in the case of the external type.

While the form of embodiment of the invention as herein disclosed, constitutes a preferred form it is to be understood that other forms might be adopted, all coming within the scope of the claims which follow.

What is claimed is as follows:

1. In a frictional power transmitter a driving member and a driven member having their shafts extending in the same longitudinal direction, one of said members comprising a pulley having cheeks bearing opposedly facing frictional surfaces, a shaft for said pulley, one of said cheeks being axially displaceable with respect to the other, the other of said members including a friction annulus encircling said pulley and attached to the driven member in power transmitting relation, external threads on the pulley shaft, an internally threaded sleeve engaging with said threads and carrying said axially displaceable cheek, said threads being arranged to advance said cheek into clamping frictional power transmitting engagement with said annulus, and a spring attached to said cheek and said shaft to urge the displacement of said cheek through agency of said threads.

2. In a power transmitter, the combination of a driving member and a driven member, shafts for each of said members disposed in the same longitudinal direction, a driving surface on the driven member, a driving pulley threaded on the driving shaft, a torsion spring interposed between the shaft and pulley for urging the pulley into driving engagement with the driven member, said pulley being adapted to rotate about the shaft and to move along the shaft to increase the force of the driving connection due to the inertia of the pulley when the shaft begins to rotate.

3. In a power transmitter, the combination of a driving shaft and a driven shaft disposed in the same longitudinal direction, a driving surface on the driven shaft, a driving member threaded on the driving shaft, said member having a driving surface for engagement with the first mentioned driving surface and arranged for rotative and longitudinal movement toward the first driving surface due to the inertia of the member when said driving shaft begins to rotate, and means for augmenting said rotative and longitudinal movement including a spring interposed between the driving member and its driving shaft.

In testimony whereof I hereto affix my signature.

OTTO M. SUMMERS.